United States Patent [19]

Yamada et al.

[11] Patent Number: 5,816,670
[45] Date of Patent: Oct. 6, 1998

[54] VEHICLE BRAKE CONTROL DEVICE

[75] Inventors: Shinichi Yamada; Nobuhiko Makino, both of Anjyo, Japan

[73] Assignee: Toyota Jidosha Kabushiki Kaisha, Toyota, Japan

[21] Appl. No.: 760,081

[22] Filed: Dec. 4, 1996

[30] Foreign Application Priority Data

Dec. 5, 1995 [JP] Japan .................................. 7-316739

[51] Int. Cl.$^6$ .................................................. B60T 8/58
[52] U.S. Cl. ........................... 303/194; 701/70; 303/191
[58] Field of Search .................................. 303/137, 145, 303/150, 149, 191, 194, 195, 196, 199, 121, 169, 198, 159, 139; 364/426.01, 426.015, 426.016; 180/197; 188/181 C, 181 A; 701/71, 78, 70

[56] References Cited

U.S. PATENT DOCUMENTS

| | | | |
|---|---|---|---|
| 3,797,893 | 3/1974 | Burckhardt et al. | 303/159 |
| 4,976,330 | 12/1990 | Matsumoto | 303/194 |
| 5,324,102 | 6/1994 | Roll et al. | 303/194 |
| 5,386,366 | 1/1995 | Roll et al. | 303/137 |

FOREIGN PATENT DOCUMENTS

| | | | |
|---|---|---|---|
| 4201772 | 7/1992 | Japan . | |
| 4230461 | 8/1992 | Japan | 303/159 |

*Primary Examiner*—Douglas C. Butler
*Attorney, Agent, or Firm*—Kenyon & Kenyon

[57] ABSTRACT

A brake control device for detecting a rear lift-up state of a vehicle, during braking, after a determination that: the driving surface has a high $\mu$ value; a rear wheel velocity is greater than a maximum front wheel velocity; and the same rear wheel has an acceleration within a specified range. Once the rear lift-up state is detected, and reference vehicle velocity is decreased by a specified value.

8 Claims, 7 Drawing Sheets

VEHICLE BRAKE CONTROL DEVICE

FIELD OF THE INVENTION

This invention relates to a vehicle condition detection device and a brake control device for executing anti-skid braking control and other controls.

BACKGROUND OF THE INVENTION

A brake control device is known for executing an anti-skid control or ABS control for increasing a braking force at the time of braking on a vehicle.

The ABS control provides slippage of a locked wheel when braking is detected. The locked condition of the wheel is eased and the rotational velocity of the wheel is adjusted to provide the highest braking force. There are various types of conventional ABS controls.

In a general ABS control device, the velocities of all four wheels are detected. By providing a specified guard on the maximum velocity among these velocities, a standard velocity or reference vehicle velocity is obtained. The wheel having a large locked tendency is identified from the front and rear wheels. The front wheels and rear wheels are separately controlled via wheel cylinder hydraulic pressure according to the difference between the reference vehicle velocity and the velocity of the largely locked wheel. Conventionally, the front wheels are controlled by individual wheel cylinder hydraulic pressures and the rear wheels are controlled by another wheel cylinder hydraulic pressures. The velocity of the largely locked wheel is controlled such that its locked condition is thus eliminated and a maximum braking force is provided.

In general, such conventional brake control device assures a sufficient braking force, however, this device does not without shortcomings.

For example, a one box car having a high gravity center and a short wheel base tends to be in a rear lift-up state in which a rear wheel is lifted from the driving surface. When the braking condition of the rear wheels of the car is controlled with the same wheel cylinder pressure, if one rear wheel is lifted, the velocity of the lifted rear wheel decreases, which creates a large difference between the velocity of the lifted rear wheel and the reference vehicle velocity. As a result, the lifted rear wheel is incorrectly determined to be in a locked condition. To eliminate the locked condition, the rear wheel cylinder pressure is decreased. However, since both rear wheels are controlled with the same wheel cylinder pressure, the braking force of the rear wheel contacting the ground is excessively decreased. The rotational velocity of the rear wheel on the ground is reduced insufficiently. Therefore, the rotation velocity of the rear wheel on the ground remains high, thereby providing a maximum wheel velocity.

As aforementioned, the vehicle velocity is estimated from the maximum wheel velocity. While the vehicle is in the rear lift-up state, the reference vehicle velocity is based on the velocity of the rear wheel contacting the ground.

The velocity of the rear wheel contacting the ground results from the excessive reduction of the wheel cylinder pressure and is significantly greater than the velocity of the rear wheels of a vehicle not in the rear lift-up state. The reference vehicle velocity is excessively high, which results in an excessively high determination of slippage. Consequently, the wheel cylinder pressure of the front wheels is also reduced, thereby decreasing the whole braking force.

SUMMARY OF THE INVENTION

Wherefore, an object of the present invention is to provide a brake control device for detecting and compensating for a rear lift-up state, thereby obtaining an appropriate reference vehicle velocity, and providing a high braking capability.

To attain this and other objects, the present invention provides a vehicle brake control device for controlling brake pressures on left and right rear wheels at the substantially same pressure between the left rear wheel and the right rear wheel. The vehicle brake control device is provided with a detector for detecting a rear lift-up state in which a rear wheel is lifted from a driving surface when all of the following conditions are met:

(i) brakes of the left and right rear wheels are pressurized,
(ii) a velocity of one of the rear wheels is greater than a maximum velocity of front wheels, and
(iii) a deceleration of one of rear wheels is less than a first specified value. The detector detects that a rear wheel, which has a velocity greater than a maximum velocity of front wheels, is lifted from a driving surface.

The rear lift-up state is determined, when a driver applies the brake, front wheels slip, thereby reducing the front wheel velocity, one rear wheel contacts the driving surface so that its velocity is only slightly decreased, and the other rear wheel is lifted, having its velocity significantly reduced.

The rear lift-up state can be precisely detected by detecting the front and rear wheel velocities.

The present invention provides a brake control device for controlling brake pressures on left and right rear wheels at the substantially same pressure between the left rear wheel and the right rear wheel. The vehicle brake control device is provided with a detector for detecting a rear lift-up state in which a rear wheel is lifted from a driving surface when all of the following conditions are met:

(i) brakes of the left and right rear wheels are pressurized,
(ii) the driving surface has a high to value, and
(iii) a deceleration of one of rear wheels is less than a specified value. The detecting means detects that one of the rear wheels is lifted from a driving surface.

When the vehicle is running on the high $\mu$ road, the wheels do not easily slip and the braking force is high. Therefore, the vehicle velocity is considered to be quickly decreased. Even in this case, if the rear wheels decelerate only slightly, the rear wheel cylinder pressure is reduced, and the vehicle is determined to be in the rear lift-up state.

Further in the invention, although the similar phenomenon arises when an engine brake is applied in a FF (Front Engine Front Drive) car running on the low $\mu$ road, the phenomenon can be distinguished from the rear lift-up state. Because it is determined in the brake control device whether or not the vehicle is running on the high $\mu$ road.

It is determined that the vehicle is running on the high $\mu$ road:

when at the time of braking the wheels slip slightly relative to the reference vehicle velocity;

when under the ABS control the wheels quickly regain velocity; and when at the time of braking the vehicle deceleration detected by a G sensor has a large value.

The brake control device is further provided with a high $\mu$ detector for detecting that the driving surface has a high $\mu$ value when a vehicle deceleration is greater than a second specified value.

In this structure, the rear lift-up state is strictly and correctly detected.

The invention provides another brake control device for controlling brake pressures on left and right rear wheels at the substantially same pressure between the left rear wheel and the right rear wheel. The vehicle brake control device is provided with a detector means for detecting a rear lift-up state in which a rear wheel is lifted from a driving surface when all of the following conditions are met:

(i) brakes of the left and right rear wheels are pressurized,
(ii) the driving surface has a high $\mu$ value,
(iii) a velocity of one of the rear wheels is greater than a maximum velocity of front wheels, and
(iv) a deceleration of one of rear wheels is less than a specified value. The detector detects that a rear wheel, which has a velocity greater than a maximum velocity of front wheels, is lifted from a driving surface.

The vehicle brake control device is further provided with a high $\mu$ detector means for detecting that the driving surface has a high $\mu$ value when a vehicle deceleration is greater than a second specified value.

Even when the vehicle is driving on the high $\mu$ road and the vehicle deceleration has a large value, if the rear wheel deceleration has a small value, the vehicle is determined to be in the rear lift-up state.

The invention provides a brake control device for controlling brake pressures on left and right rear wheels at the substantially same pressure between the left rear wheel and the right rear wheel. The vehicle brake control device is provided with a detector for detecting a rear lift-up state in which a rear wheel is lifted from a driving surface, and a changing unit for changing a reference vehicle velocity based on velocities of rear wheels when the detector detects a rear lift-up state.

When the brake control, for example, an anti-lock control is executed in the vehicle having the rear lift-up state, the reference vehicle velocity is set based on the rear wheel on the ground. If the velocity of the rear wheel on the ground is excessively high, the reference vehicle velocity is also excessively high. When the vehicle is in the rear lift-up state, the excessively high reference vehicle velocity is regarded to be inappropriate and is accordingly adjusted. Therefore, the appropriate brake control can be executed with the adjusted reference vehicle velocity.

The invention provides the brake control device in which the changing unit prohibits the reference vehicle velocity from being based on a velocity of the rear wheel.

The rear wheel other than the detected lifted rear wheel has a rather high velocity. Excessively high reference vehicle velocity is obtained from such high velocity of the non lifted rear wheel. Therefore, in the brake control device, when the rear lift-up state is detected, the inappropriately high velocity of the non lifted rear wheel is not used, and an appropriate reference vehicle velocity is obtained based on the velocity of the wheels other than the non lifted rear wheel having an excessively high velocity.

In the brake control device, the changing unit adjusts the reference vehicle velocity downward.

For example, the rather high reference vehicle velocity is already obtained before the velocity of the specified wheel is inhibited from being used for transmitting the reference vehicle velocity. In this case, the reference vehicle velocity is equal to the previous reference vehicle velocity with a specified value subtracted therefrom. In this way the high reference vehicle velocity is adjusted downwards to compensate for the excessively high velocity of the non lifted rear wheel.

In the vehicle brake control device, the changing unit adjusts the reference vehicle velocity downward.

The vehicle brake control device is further provided with an anti-lock controller for controlling a brake pressure on a wheel in order to prevent the wheel from locking.

In the brake control device, an anti-lock control is appropriately executed by determining the rear lift-up state during vehicle braking.

Also, when the reference vehicle velocity is corrected as aforementioned in the anti-lock control, an improved braking capability can be provided.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 1:
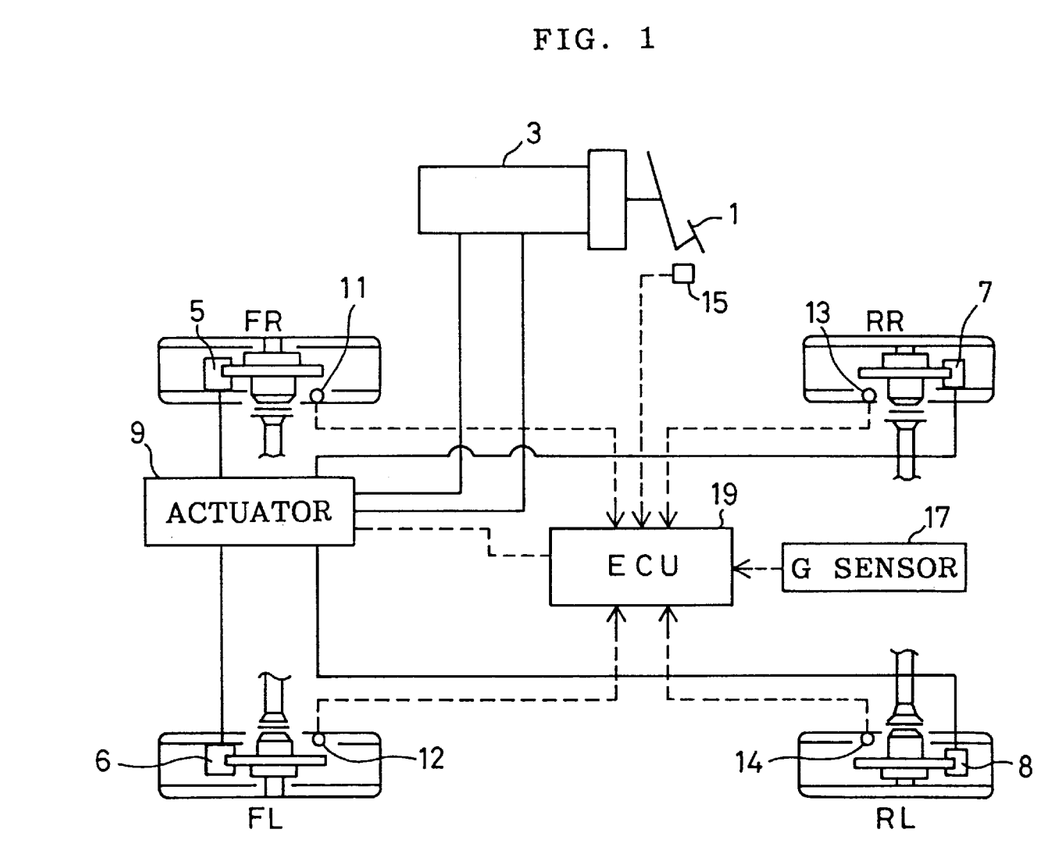
FIG. 1 is a block diagram of an automotive brake control device for executing an anti-skid control (herein referred to as ABS control)

As shown in FIG. 1, a brake control device is composed of a master cylinder 3 connected to a brake pedal 1, wheel cylinders 5, 6, 7 and 8 disposed in a front right wheel FR, a front left wheel FL, a rear right wheel RR, and a rear left wheel RL, respectively, a hydraulic pressure control mechanism or actuator 9 for adjusting the hydraulic pressure of the wheel cylinders 5, 6, 7 and 8, wheel velocity sensors 11, 12, 13 and 14 for detecting the velocity of the wheels FL, FR, RR and RL, respectively, a brake switch 15 for detecting that the brake pedal 1 is stepped on, and a G sensor 17 for detecting a vehicle acceleration.

Signals are transmitted from the wheel velocity sensors 11, 12, 13, 14, the brake switch 15, the G sensor 17 and the associated component to the electronic control unit 19 (hereinafter referred to as ECU), which in turn controls the actuator 9 based on the signals, adjusting the hydraulic pressure or wheel cylinder pressure for providing a braking force.

Especially in the actuator 9 for conducting the ABS control, a hydraulic pressure circuit is composed such that the front wheels are controlled by means of the individual wheel cylinder pressures, while the rear wheels are controlled by means of the same wheel cylinder pressure.

The ABS control of the brake control device is now explained referring to the flowcharts of FIGS. 2 thru 5.

Figure 2:
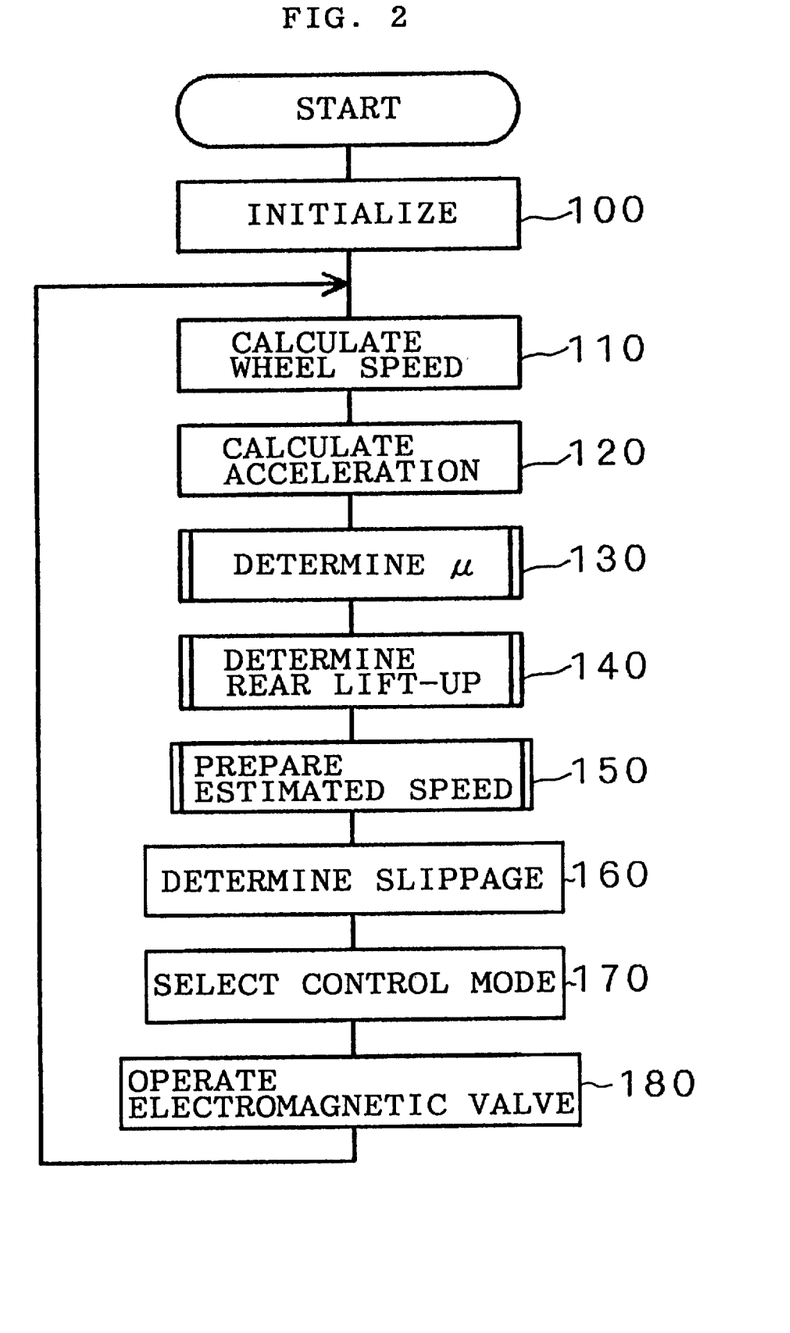
FIG. 2 is a flowchart of a main routine of the ABS control.

Referring to the flowchart of FIG. 2, a main routine of the ABS control is first explained. The main routine starts when an ignition switch (not shown) is turned on.

After the main routine starts, flags F1 and F2 and a counter value t, described later, are initialized at step 100.

At step 110, the velocity of the wheels FR, FL, RR and RL is calculated based on the signals transmitted from the wheel velocity sensors 11, 12, 13 and 14, respectively.

At step 120, vehicle wheel acceleration is calculated by differentiating each vehicle wheel velocity.

At step 130 (later detailed with reference to FIG. 3) a driving surface $\mu$ value is determined. It is determined whether or not a vehicle is driven on a high $\mu$ value surface.

At step 140 (later detailed with reference to FIG. 4) it is determined whether or not the vehicle has a rear lift-up state in which a rear wheel RR or RL is lifted from the driving surface.

At step 150 (later detailed with reference to FIG. 5) an appropriate reference vehicle velocity (i.e. estimated vehicle speed) is prepared corresponding to the condition of the vehicle.

At step 160, a slippage of each wheel is determined. Specifically, the slippage of each wheel is based on the difference between the reference vehicle velocity and the wheel velocity. For example, a large difference indicates a large slippage and the vehicle wheel is determined to be in locked condition.

At step 170, a control mode of the ABS control is selected according to the magnitude of the determined slippage. The three control modes are a pressure increase mode for increasing the wheel cylinder pressure, a retention mode for maintaining the wheel cylinder pressure and a pressure decrease mode for decreasing the wheel cylinder pressure. Also, the switching timing and duration of the control modes are predetermined.

For the front wheels (FR and FL), the control mode is set according to the slippage of each wheel. For the rear wheels (RR and RL), a rear wheel low selection control is carried out. The low selection control allows the rear wheels to be controlled via the same wheel cylinder pressure, according to the slippage condition of the rear wheel having the largest extent of locking.

At step 180, the control mode is set by operating a hydraulic pressure control valve or electromagnetic valve of the actuator 9. The switching timing and duration of the control modes are executed according to the predetermined values from step 170. Finally, the process returns to step 110.

Figure 3:
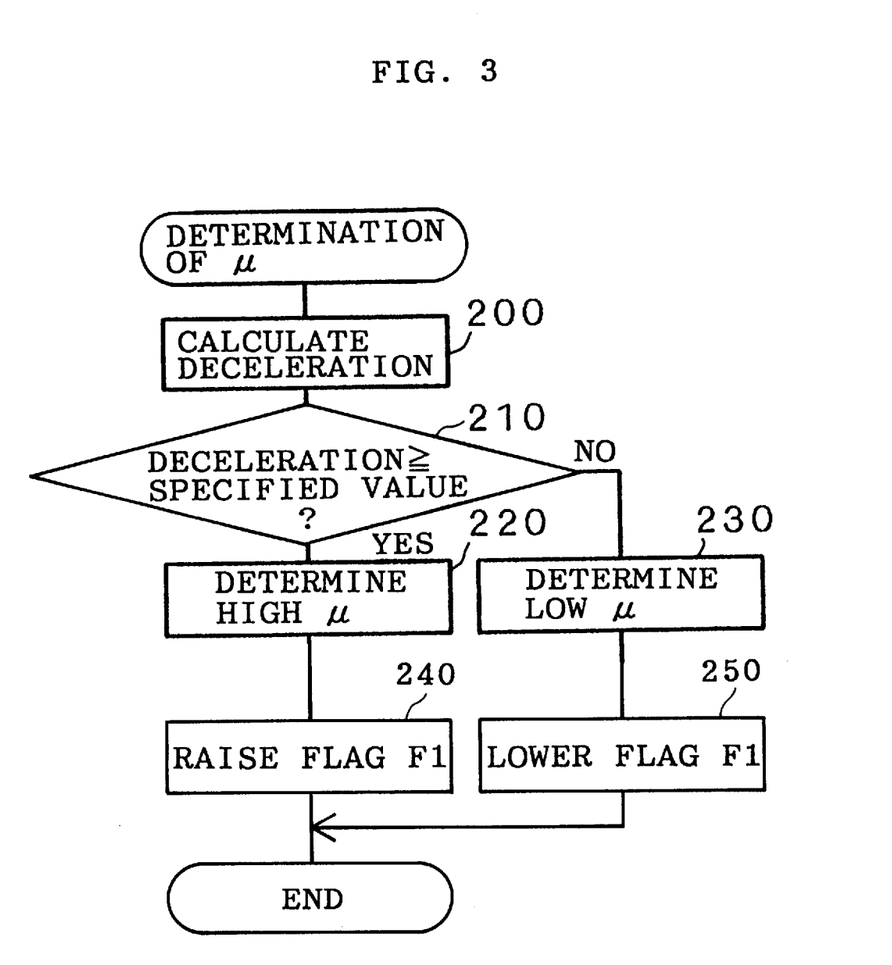
FIG. 3 is a flowchart of a process for determining a $\mu$ value of a driving surface.

The determination of road surface $\mu$ executed at step 130 is explained referring to the flowchart of FIG. 3.

At step 200, vehicle deceleration is obtained based on the signal transmitted from the G sensor 17.

At step 210, it is determined whether or not the vehicle deceleration is greater than or equal to a specified value when the brake switch 15 is turned on. Specifically, it is determined whether or not the vehicle is decelerated immediately after the brake pedal 1 is stepped on. If the answer to step 210 is affirmative, the process advances to step 220, while if the answer to step 210 is negative, the process goes to step 230.

At step 220, the road surface is determined to have a high $\mu$ value or a normal condition, because the vehicle deceleration is large and the vehicle is decelerated immediately after the brake pedal 1 is stepped on. At step 240 flag F1 is set or raised to indicate a high $\mu$ road.

At step 230, the road surface is determined to have a low $\mu$ value, for example the road surface is frozen, because the deceleration is small and the vehicle is not easily decelerated even after the brake pedal 1 is stepped on. At step 250 the flag F1 is reset or lowered to indicate a low $\mu$ road.

Figure 4:
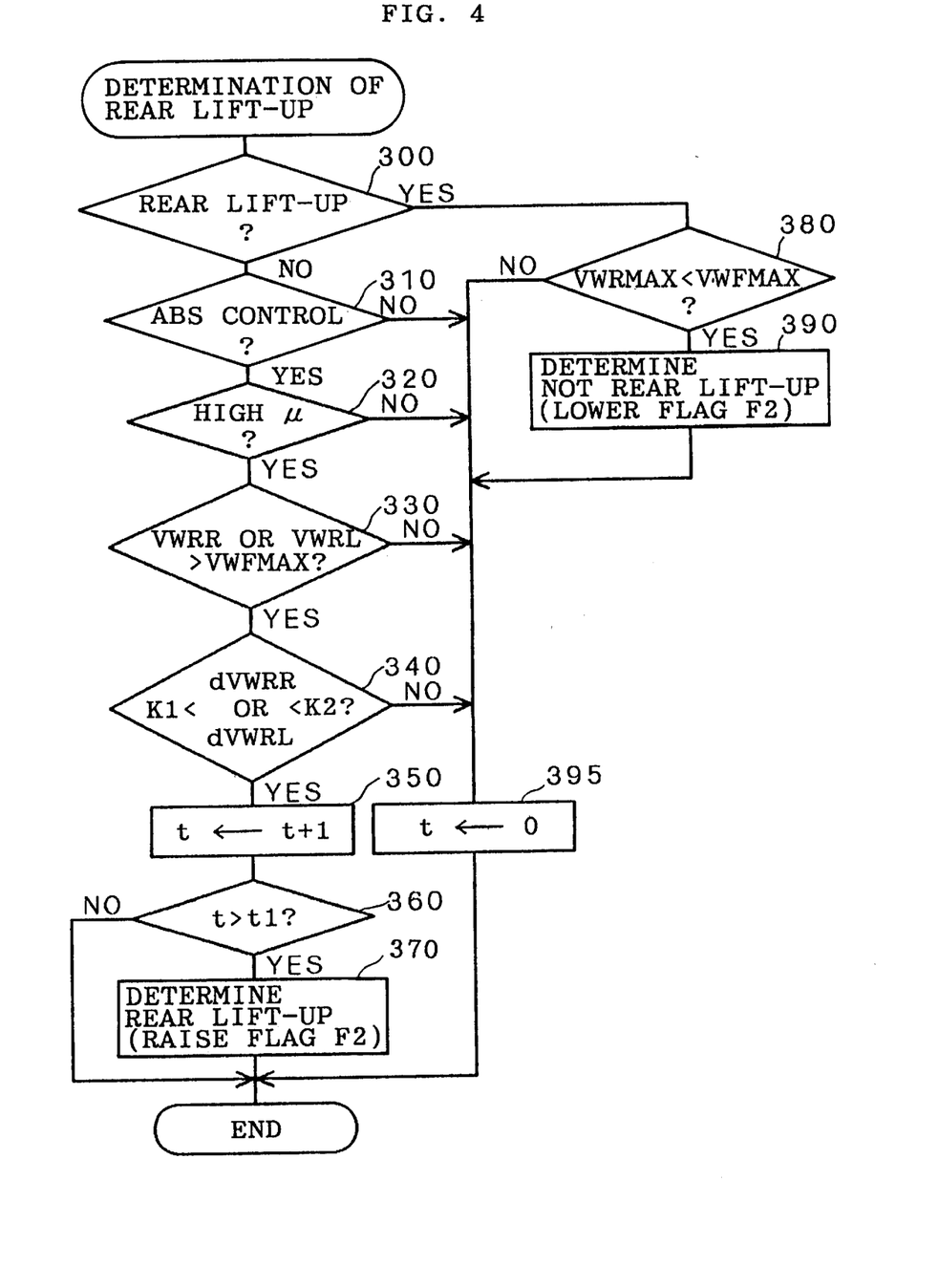
FIG. 4 is a flowchart of a process for determining a rear lift-up state.

The determination of rear lift-up state at step 140 is explained referring to the flowchart of FIG. 4.

At step 300, it is determined whether or not the rear lift-up state exists. If so, the process advances to step 380. If not, the process advances to step 310.

At step 310, it is determined whether or not the ABS control has been executed because the wheel slippage was determined to be large. If so, the process advances to step 320. If not, the process advances to step 395.

At step 395, the counter value t is reset to zero. The counter updates the frequency with which the process is repeated for accurately determining when the rear lift-up state occurs.

At step 320, it is determined whether or not the road has a high $\mu$, according to the result of step 130 of the main routine (FIG. 2), i.e. the condition of flag F1 (raised or lowered). If so, the process advances to step 330. If not, the process advances to the step 395.

At step 330, it is determined whether or not a rear right wheel velocity VWRR or a rear left wheel velocity VWRL exceeds a maximum front wheel velocity VWFMAX. If so, the process advances to step 340. If not, the process advances to the step 395.

At step S340, it is determined whether or not an acceleration dVWRR or dVWRL of the corresponding rear right or rear left wheel is a value in a specified range higher than a value K1 and lower than a value K2. If so, the process advances to step 350. If not, the process advances to step 395.

At step 350, the counter value t is incremented by one (1).

At step 360, it is determined whether or not the counter value t exceeds the specified frequency t1. If so, the process advances to step 370. If not, the process once ends.

When it has been continuously determined with the specified frequency that the ABS control is executed, the road has a high $\mu$, a rear wheel velocity exceeds the maximum front wheel velocity and the acceleration of the corresponding rear wheel is small, it is in turn determined at step 370 that the vehicle is in the rear lift-up state in which one of the rear wheels is lifted from the driving surface. Therefore, the flag F2 indicating the rear lift-up state is set or raised.

After it is determined at step 300 that the rear lift-up state has been determined, it is determined at step 380 whether or not a maximum rear wheel velocity VWRMAX is less than a maximum front wheel velocity VWFMAX. Specifically, it is determined whether or not the rear lift-up state has finished. If so, the process advances to step 390. If not, the process advances to the step 395.

When the maximum rear wheel velocity VWRMAX is less than the maximum front wheel velocity VWFMAX, both rear wheels (RR and RL) are in contact with the driving surface and it is determined at step 390 that the vehicle is not in the rear lift-up state. The flag F2 indicating the rear lift-up state is, therefore, reset or lowered, and the process advances to step 395.

In the routine shown in the flowchart of FIG. 4, it is determined whether or not the vehicle is in the rear lift-up state.

Figure 5:
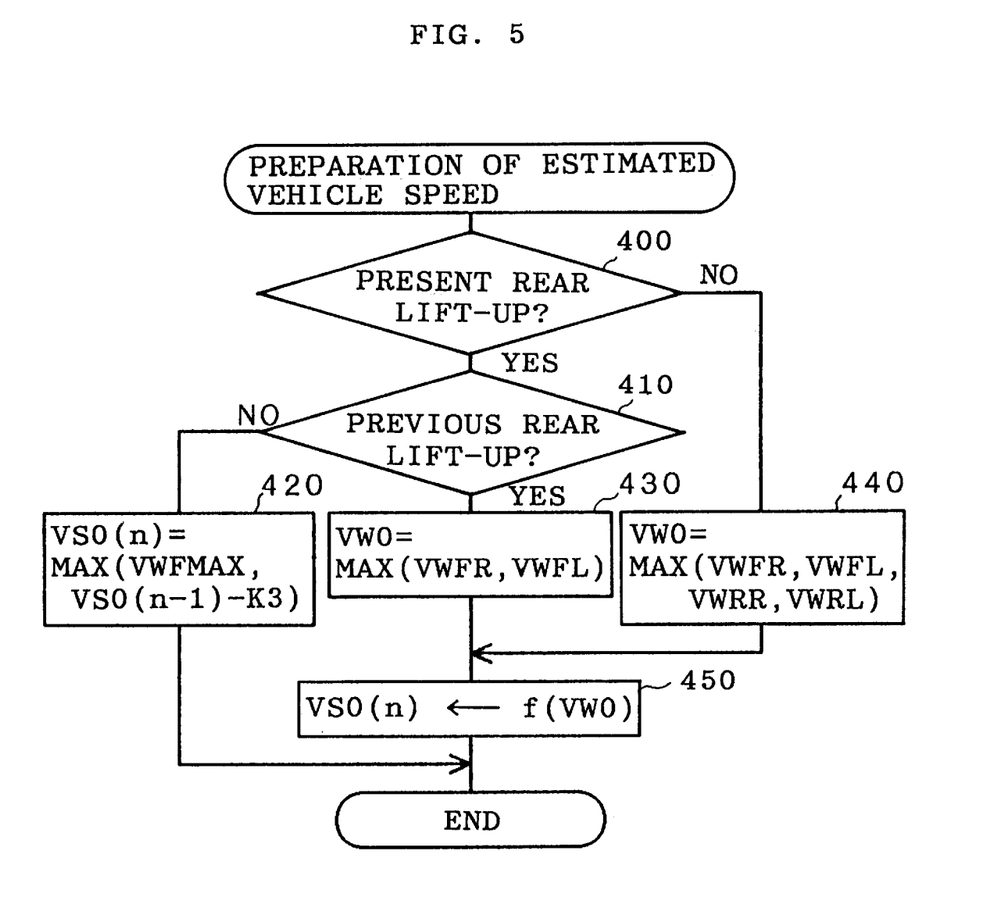
FIG. 5 is a flowchart of a process for preparing a reference vehicle velocity.

The estimation of vehicle velocity at step 150 is now explained referring to the flowchart of FIG. 5.

At step 400, it is determined whether or not the rear lift-up state has been determined. If so, the process advances to step 410. If not, the process advances to step 440.

At step 440, the maximum velocity value of all the wheel (VWFR, FWFL, VWRR and VWRL) is set as a standard wheel velocity VWO with which the reference vehicle velocity is obtained.

At step 450, a present reference vehicle velocity VSO(n) is obtained from f(VWO) by bounding the standard wheel velocity VWO between upper and lower limits and excluding excessively high or low velocity values from the standard wheel velocity VWO.

At step 410, it is determined whether or not it was previously determined that the vehicle was in the rear lift-up state. If so, the process advances to step 430. If not, the process advances to step 420.

Figure 6:
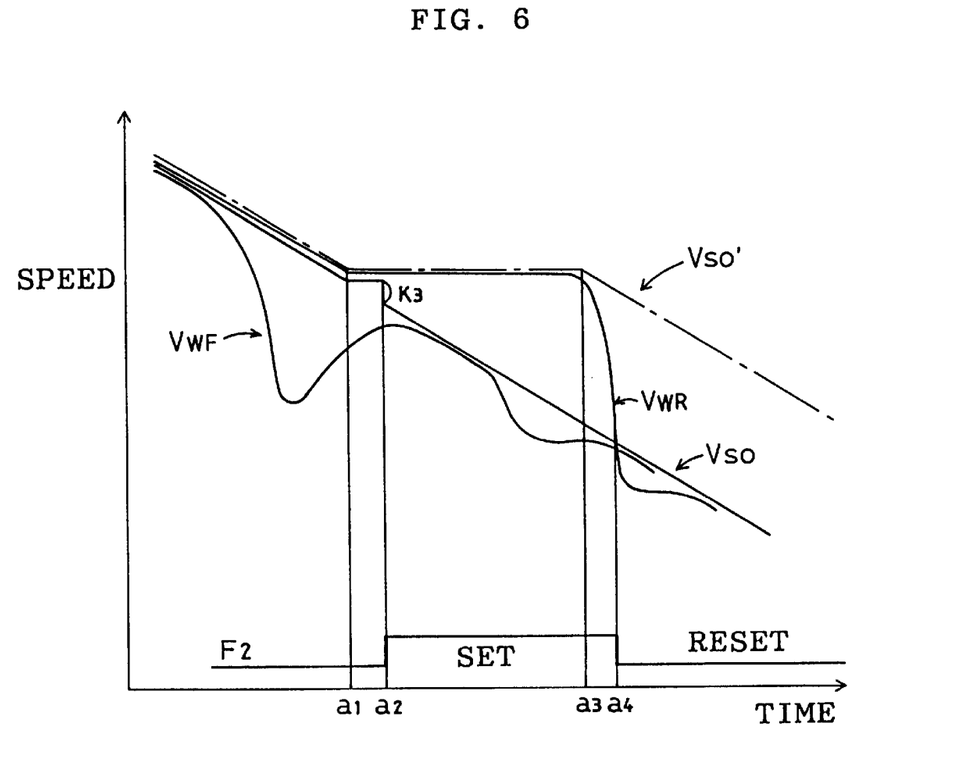
FIG. 6 is a graph showing a front wheel velocity, a rear wheel velocity, a conventional reference vehicle velocity and a reference vehicle velocity during a braking control, according to the present invention, in which a rear lift-up state occurs.

At step 420, the present reference vehicle velocity VSO (n) is obtained by selecting the larger value from the group consisting of maximum front wheel velocity VWFMAX and a previous reference vehicle velocity VSO(n−1) with a constant K3 subtracted therefrom. As shown in FIG. 6 (and detailed later), when the rear lift-up state has been previously determined, the reference vehicle velocity is set rather high. To correct the reference vehicle velocity, the constant K3 is subtracted from the previous reference vehicle velocity VSO(n−1).

When the vehicle is determined to be in the rear lift-up state both previously and presently, the velocity of the rear wheel contacting the ground is excluded from consideration. Specifically, at step 430 the higher velocity of the front right and left wheel velocities VWFR and VWFL is set as the standard wheel velocity VWO. In this case, since the velocity of the lifted up rear wheel is low, it can also be excluded from consideration.

At the step 450, the present reference vehicle velocity VSO(n) is obtained from the standard wheel velocity VWO as aforementioned, and the process once ends.

In the aforementioned process, an appropriate reference vehicle velocity can be obtained corresponding to the rear lift-up state.

Figure 7:
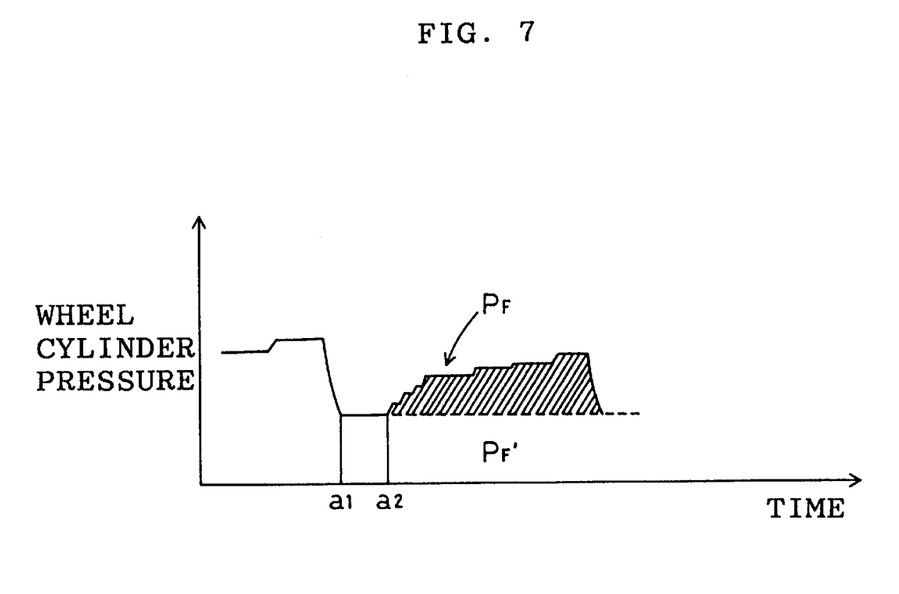
FIG. 7 is a graph showing a wheel cylinder pressure during a braking control, according to the present invention, in which a rear lift-up state occurs.

The advantages of the process according to the present invention are now explained referring to FIGS. 6 and 7.

As shown in FIG. 6, under the ABS control during the braking operation, a velocity VWF of either front wheel and a velocity VWR of the rear wheel contacting the ground are decreased, and a reference vehicle velocity VSO is set corresponding the maximum wheel velocity.

At a time a1, when the rear lift-up state arises, the velocity of the lifted up rear wheel is decreased. It is determined that the lifted up rear wheel has a large lock tendency. According to the condition of the lifted up rear wheel, both the rear wheels are controlled with the same wheel cylinder pressure. Specifically, the wheel cylinder pressure of the rear wheel on the ground is decreased, thereby decreasing the braking force applied to the rear wheel on the ground. Therefore, the velocity of the rear wheel on the ground is higher than that of the front wheels. The reference vehicle velocity is set corresponding to the high velocity of the rear wheel contacting the ground. Therefore, as shown in FIG. 6, the reference vehicle velocity is set rather high after the time a1.

A conventional reference vehicle velocity VSO', which is set higher than the reference vehicle velocity VSO of the embodiment, continues to be high until time a3, when the rear lift-up state ends. After the time a3, the conventional reference vehicle velocity VSO' is gradually decreased but keeps higher than the reference vehicle velocity VSO. Since there is a large difference between the reference vehicle velocity VSO' and each wheel velocity, the lock tendency is considered to be large, and the wheel cylinder pressure is set rather low. As a result, the braking force is disadvantageously decreased.

In the present invention, at time a2 when the rear lift-up state is detected, the constant K3 is subtracted from the reference vehicle velocity VSO. Therefore, the reference vehicle velocity VSO is appropriately set where the rear lift-up state is first detected, i.e. a previous rear lift-up state was not detected.

Afterwards, the maximum wheel velocity is selected from the velocities of the vehicle wheels other than the rear wheel in contact with the driving surface, and the reference vehicle velocity VSO is calculated based on the maximum wheel velocity. Therefore, the reference vehicle velocity VSO can be set appropriately.

At time a4, when the finish of the rear lift-up state is detected, the reference vehicle velocity VSO is obtained corresponding to the maximum wheel velocity selected from the velocities of all the wheels. Therefore, even after the time a4, the reference vehicle velocity VSO can be set appropriately.

Changes in the rear wheel cylinder pressure are explained referring to FIG. 7.

As shown in FIG. 7, conventionally, at the time a1 when the rear lift-up state arises, a wheel cylinder pressure PF' is set low, thereby decreasing the braking force.

However, in the embodiment, at the time a2 when the rear lift-up state is detected, the reference vehicle velocity VSO is adjusted to an appropriate value. Accordingly, a wheel cylinder pressure PF is appropriately controlled, thereby increasing the braking force.

As aforementioned, during ABS control, when the vehicle is driving on the high $\mu$ road, the velocity of a rear wheel exceeds that of the front wheels, and the corresponding rear wheel acceleration is low, then it is determined that the vehicle is in the rear lift-up state. The rear lift-up state is precisely detected.

When the rear lift-up state is detected, first the reference vehicle velocity is decreased by the specified value K3. If the reference vehicle velocity is incorrectly obtained before the rear lift-up state is detected, it is quickly adjusted to an appropriate value.

After the rear lift-up state is detected, the reference vehicle velocity can be precisely set by excluding the velocity of the rear wheel on the ground from the standard wheel velocity.

For example, even if one box car is placed in the rear lift-up state during the ABS control, the reference vehicle velocity is appropriately set, and a high braking force is advantageously provided.

In the aforementioned embodiment, the braking control is described with reference to ABS control. The braking control can also be applied to a cornering vehicle placed in the rear lift-up state.

In the embodiment, it is determined at step 320 whether or not the vehicle is driving on a high $\mu$ road, the front wheel velocity is compared with the rear wheel velocity at step 330, and the rear wheel acceleration is determined at step 340. However, the present invention can be effectively carried out where only two of these steps are executed. For example, the steps 320 and 340 or the steps 330 and 340 can be executed to detect the rear lift-up state. The precision in the detection of the rear lift-up state is only slightly impaired.

In the embodiment, the reference vehicle velocity is obtained based on the maximum velocity selected from the velocities of all the four wheels. Alternatively, the reference vehicle velocity can be obtained from the higher velocity selected from the maximum front wheel velocity and the average velocity of the rear wheels: MAX(VWFMAX, (VWRMAX+VWRMIN)/2).

This invention has been described above with reference to the preferred embodiment as shown in the figures. Modifications and alterations may become apparent to one skilled in the art upon reading and understanding the specification. Despite the use of the specific embodiment for illustration purposes, the invention is intended to include all such modifications and alterations within the spirit and scope of the appended claims.

What is claimed is:

1. A vehicle brake control device for controlling brake pressures on left and right rear wheels at substantially the same pressure between the left rear wheel and the right rear wheel, said vehicle brake control device comprising:

a detecting means for detecting a rear lift-up state in which a rear wheel is lifted from a driving surface when all of the following conditions are met:
   (i) brakes of the left and right rear wheels are pressurized,
   (ii) a velocity of one of the rear wheels is greater than a maximum velocity of front wheels, and
   (iii) a deceleration of one of rear wheels is less than a first specified value;
   whereby said detecting means detects that a rear wheel, which has a velocity greater than a maximum velocity of front wheels, is lifted from a driving surface.

2. A vehicle brake control device according to claim 1, further comprising:

an anti-lock control means for controlling a brake pressure on a wheel in order to prevent said wheel from locking.

3. A vehicle brake control device for controlling brake pressures on left and right rear wheels at substantially the same pressure between the left rear wheel and the right rear wheel, said vehicle brake control device comprising:

a detecting means for detecting a rear lift-up state in which a rear wheel is lifted from a driving surface when all of the following conditions are met:
   (i) brakes of the left and right rear wheels are pressurized,
   (ii) said driving surface has a high $\mu$ value, and
   (iii) a deceleration of one of rear wheels is less than a specified value;
   whereby said detecting means detects that one of the rear wheels is lifted from a driving surface.

4. A vehicle brake control device according to claim 3, further comprising:

a high $\mu$ detecting means for detecting that said driving surface has a high $\mu$ value when a vehicle deceleration is greater than a second specified value.

5. A vehicle brake control device for controlling brake pressures on left and right rear wheels at substantially the same pressure between the left rear wheel and the right rear wheel, said vehicle brake control device comprising:

a detecting means for detecting a rear lift-up state in which a rear wheel is lifted from a driving surface when all of the following conditions are met:
   (i) brakes of the left and right rear wheels are pressurized,
   (ii) said driving surface has a high $\mu$ value,
   (iii) a velocity of one of the rear wheels is greater than a maximum velocity of front wheels, and
   (iv) a deceleration of one of rear wheels is less than a specified value;
   whereby said detecting means detects that a rear wheel, which has a velocity greater than a maximum velocity of front wheels, is lifted from a driving surface.

6. A vehicle brake control device according to claim 5, further comprising:

a high $\mu$ detecting means for detecting that said driving surface has a high $\mu$ value when a vehicle deceleration is greater than a second specified value.

7. A vehicle brake control device for controlling brake pressure on left and right rear wheels at substantially the same pressure between the left rear wheel and the right rear wheel, said vehicle brake control device comprising of:

a detecting means for detecting a rear lift-up state in which a rear wheel is lifted from a driving surface, and a changing means for changing a reference vehicle velocity based on velocities of rear wheels when said detecting means detects a rear lift-up state wherein said changing means prohibits said reference vehicle velocity from being based on a velocity of the rear wheel.

8. A vehicle brake control device for controlling brake pressure on left and right rear wheels at substantially the same pressure between the left rear wheel and the right rear wheel, said vehicle brake control device comprising of:

a detecting means for detecting a rear lift-up state in which a rear wheel is lifted from a driving surface;

a changing means for changing a reference vehicle velocity based on velocities of rear wheels when said detecting means detects a rear lift-up state; and wherein said changing means adjusts said reference vehicle velocity downward.

* * * * *

UNITED STATES PATENT AND TRADEMARK OFFICE
CERTIFICATE OF CORRECTION

PATENT NO. : 5,816,670

DATED : 6 October 1998

INVENTOR(S) : Shinichi YAMADA et al.

It is certified that error appears in the above-identified patent and that said Letters Patent is hereby corrected as shown below:

On the title page item [57],

In the Abstract, line 6: Change "and" to --the--.

| Column | Line | |
|---|---|---|
| 1 | 19 | Change "guard" to --parameter--. |
| 1 | 29 | Change "another" to --other--. |
| 2 | 37 | After "high" change "to" to --µ--. |
| 2 | 66 | Change "strictly" to --consistently--. |
| 6 | 31 | Change "once" to --immediately--. |
| 6 | 64 | Change "wheel" to --wheels--. |

Signed and Sealed this

Thirtieth Day of March, 1999

Attest:

Q. TODD DICKINSON

Attesting Officer

Acting Commissioner of Patents and Trademarks